United States Patent
Pilipetskii et al.

(10) Patent No.: US 12,111,204 B2
(45) Date of Patent: Oct. 8, 2024

(54) EXTENDING DYNAMIC ACOUSTIC SENSING RANGE AND LOCALIZATION IN UNDERSEA CABLES USING LOOPBACKS

(71) Applicant: SUBCOM, LLC, Eatontown, NJ (US)

(72) Inventors: Alexei N. Pilipetskii, Colts Neck, NJ (US); Maxim A. Bolshtyansky, Millstone, NJ (US); Dmitri G. Foursa, Colts Neck, NJ (US); Georg Heinrich Mohs, East Brunswick, NJ (US); Jin-Xing Cai, Morganville, NJ (US)

(73) Assignee: SubCom, LLC, Eatontown, NJ (US)

( * ) Notice: Subject to any disclaimer, the term of this patent is extended or adjusted under 35 U.S.C. 154(b) by 263 days.

(21) Appl. No.: 17/749,420

(22) Filed: May 20, 2022

(65) Prior Publication Data

US 2022/0397448 A1    Dec. 15, 2022

Related U.S. Application Data

(60) Provisional application No. 63/213,978, filed on Jun. 23, 2021, provisional application No. 63/210,775, filed on Jun. 15, 2021.

(51) Int. Cl.
*G01H 9/00* (2006.01)
*G01D 5/353* (2006.01)

(52) U.S. Cl.
CPC ......... *G01H 9/004* (2013.01); *G01D 5/35361* (2013.01)

(58) Field of Classification Search
CPC .......... G01H 9/00; G01H 9/004; G01D 5/353; G01D 5/35361
See application file for complete search history.

(56) References Cited

U.S. PATENT DOCUMENTS

| 11,920,975 B2 * | 3/2024 | Ip ........................ H04B 10/071 |
| 2018/0274953 A1 * | 9/2018 | Molteni ............. G01D 5/35358 |

FOREIGN PATENT DOCUMENTS

| EP | 3696997 B1 | 6/2022 | |
| GB | 2546717 B * | 4/2021 | ............. G01D 5/268 |
| WO | 2016087850 A1 | 6/2016 | |

OTHER PUBLICATIONS

Bian Huichun et al., "Vibration measurement technique for repeated fiber-optic hydrophone transmission cable system", SPIE Proceedings; vol. 11554, Oct. 10, 2020.

European Search Report and Written Opinion for the European Application No. EP22177691, mailed Nov. 18, 2022, 10 pages.

* cited by examiner

*Primary Examiner* — Nguyen Q. Ha
(74) *Attorney, Agent, or Firm* — KDW Firm PLLC

(57) ABSTRACT

Apparatus, systems, and techniques for extending distributed acoustic sensing (DAS) range in undersea optical cables over multiple spans, as well as providing span-specific DAS information, are provided.

20 Claims, 10 Drawing Sheets

150

Improvement of noise performance and interrogation distance
With bandpass filter and EDFA in the return DAS signal path Improvement of noise performance and interrogation distance
With bandpass filter and EDFA in the return DAS signal path

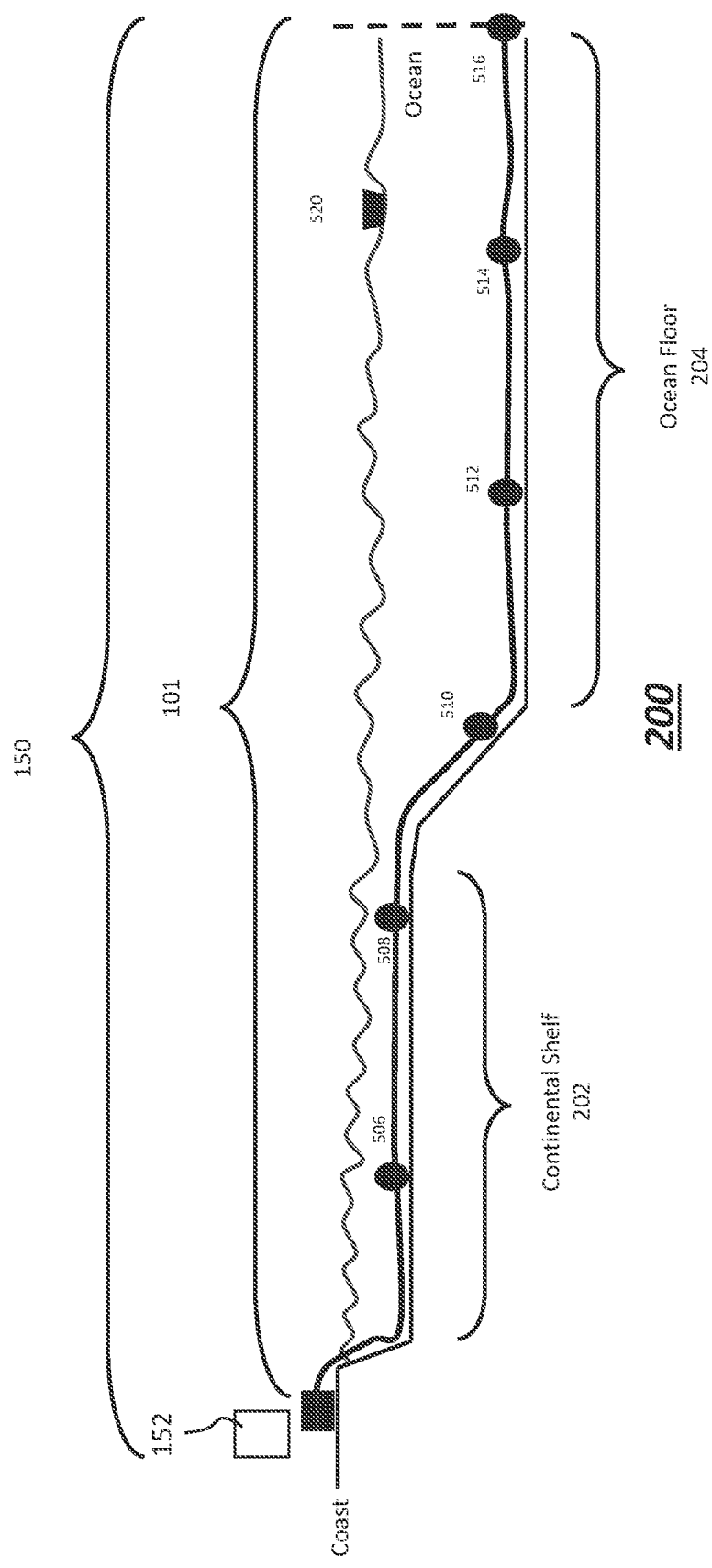

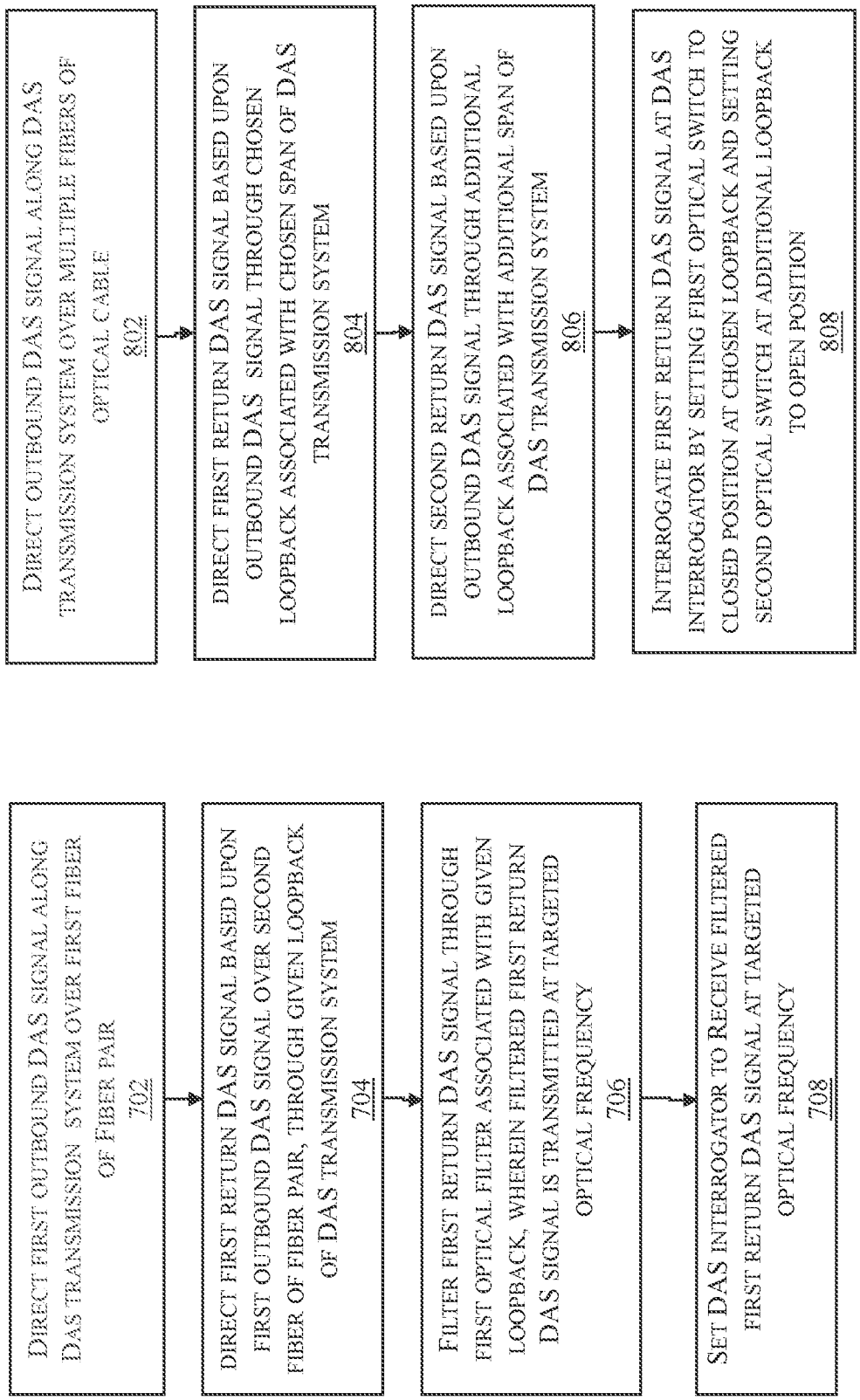

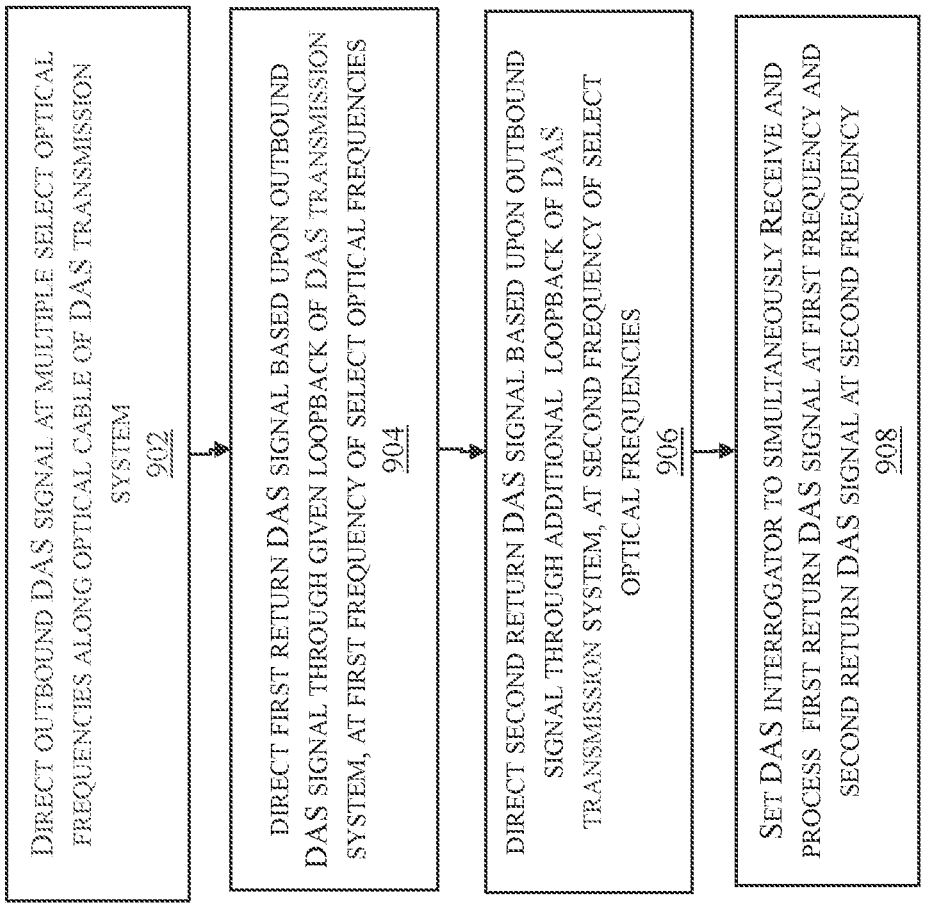

EXTENDING DYNAMIC ACOUSTIC SENSING RANGE AND LOCALIZATION IN UNDERSEA CABLES USING LOOPBACKS

RELATED APPLICATIONS

This application claims priority to U.S. provisional patent application Ser. No. 63/213,978, filed Jun. 23, 2021, entitled EXTENDING DYNAMIC ACOUSTIC SENSING RANGE AND LOCALIZATION IN UNDERSEA CABLES USING LOOPBACKS, and further claims priority to U.S. provisional patent application Ser. No. 63/210,775, filed Jun. 15, 2021,entitled EXTENDING DYNAMIC ACOUSTIC SENSING RANGE AND LOCALIZATION IN UNDERSEA CABLES USING LOOPBACKS, both of which applications are incorporated by reference herein in their entirety.

FIELD

Embodiments of the present disclosure relate to the field of optical communication systems. More particularly, the present disclosure relates to at least techniques for extending the range of distributed acoustic sensing (DAS) in undersea optical cables using loopbacks.

Discussion of Related Art

In a distributed acoustic sensing (DAS) system, an optical cable may be used to provide real-time or near real-time distributed strain sensing. In other words, the cable itself may be used as a sensing element to detect or monitor different types of disruptions, interferences, irregularities, activities, naturally occurring events, acoustic vibrations, etc. in the DAS environment (e.g., terrestrial environment, undersea environment). To do so, an optoelectronic device coupled to the optical cable of the DAS system may detect and process reflected light signals (e.g., acoustic frequency strain signals) over a specific distance in the DAS environment.

Generally, a DAS interrogator unit may probe a fiber optic cable using a coherent laser pulse, where changes in the phase of the returning optical backscatter signal are measured. Optical phase shifts between pulses may be proportional to strain in the fiber, leading to the ability to sense vibrations and the like, as mentioned. For example, the DAS system may be based on Rayleigh scattering (otherwise referred to as a Rayleigh-scattering-based DAS system). In this system, a coherent laser pulse may be sent along an optical fiber, and scattering sites within the optical fiber may cause the fiber to act as a distributed interferometer, e.g., with a gauge length approximately equal to the pulse length. The intensity of any reflected light may be measured as a function of time after transmission of the laser pulse, which is known as Coherent Rayleigh Optical Time Domain Reflectometry (COTDR).

When the laser pulse has traveled the full length of the optical fiber and back, the next laser pulse may be sent along the fiber. Changes in the reflected intensity of successive laser pulses from the same region of the fiber may be caused by changes in the optical path length of that section of the fiber. The Rayleigh-scattering-based DAS system is typically sensitive to both strain and temperature variations of the fiber, and thus, measurements can be made by the optoelectronic device almost simultaneously at all sections of the fiber.

In the Rayleigh-scattering-based DAS system, the laser pulse may be attenuated as it propagates along the optical fiber, where typical attenuation may exhibit approximately 0.2 dB optical loss per kilometer for a single mode fiber operating at 1550 nanometers. Because the laser pulse must make a double pass along the fiber, each kilometer in cable length may cause approximately 0.4 dB of optical loss. Thus, the "maximum range" of the optoelectronic device of the DAS system corresponds to when the amplitude of the reflected pulse becomes so low that it is impossible for the optoelectronic device to obtain or decipher a clear signal therefrom. Generally, the maximum range is approximately between 40 to 50 km from a coupled optoelectronic device or whenever the range reaches approximately 10 to 12 dB of total optical loss. For the past several years, DAS has been successfully utilized in boreholes for active-source seismic profiling, where a maximum range of tens of kilometers may be sufficient for many applications In the case of fiber optics deployed in cables for undersea communications, there is a growing interest in asset protection and early warning of disturbances, including impeding external aggression against undersea cables. In principle, as noted, the sensitivity of DAS to strain means DAS technology can detect acoustic noises generated by sources, such as boats, thus providing information of potential dangers and providing advanced enough warning to respond and prevent damage to a cable. However, for long range subsea cables, a fiber span may be on the order of 50 km to 100 km, while a subsea cable may extend for a total of hundreds of kilometers to thousands of kilometers. Accordingly, the DAS range and sensing capabilities of known DAS systems is significantly limited, and in most instances, the sensing range for a given DAS system is limited to a single fiber span. To account for this limitation, conventional DAS solutions may string or link together numerous standalone optoelectronic devices to cover a desired range, where each standalone optoelectronic device monitors its respective range-limited fiber span. Thus, each of the optoelectronic devices and their coupled fibers effectively form and act as separate DAS systems. Not only is this conventional solution incredibly expensive (e.g., since extending the desired range requires more and more standalone optoelectronic devices and related components), but the design thereof is also prohibitive and impracticable (or even impossible) in underwater or subsea environments or applications.

It is with respect to these and other considerations that the present disclosure is provided.

BRIEF DESCRIPTION OF THE DRAWINGS

FIG. 6 illustrates one scenario for DAS detection, according to embodiments of the present disclosure;

FIG. 7 illustrates a first example flow diagram;

FIG. 8 illustrates a second example flow diagram; and

FIG. 9 illustrates a third example flow diagram.

DESCRIPTION OF EMBODIMENTS

Figure 1:
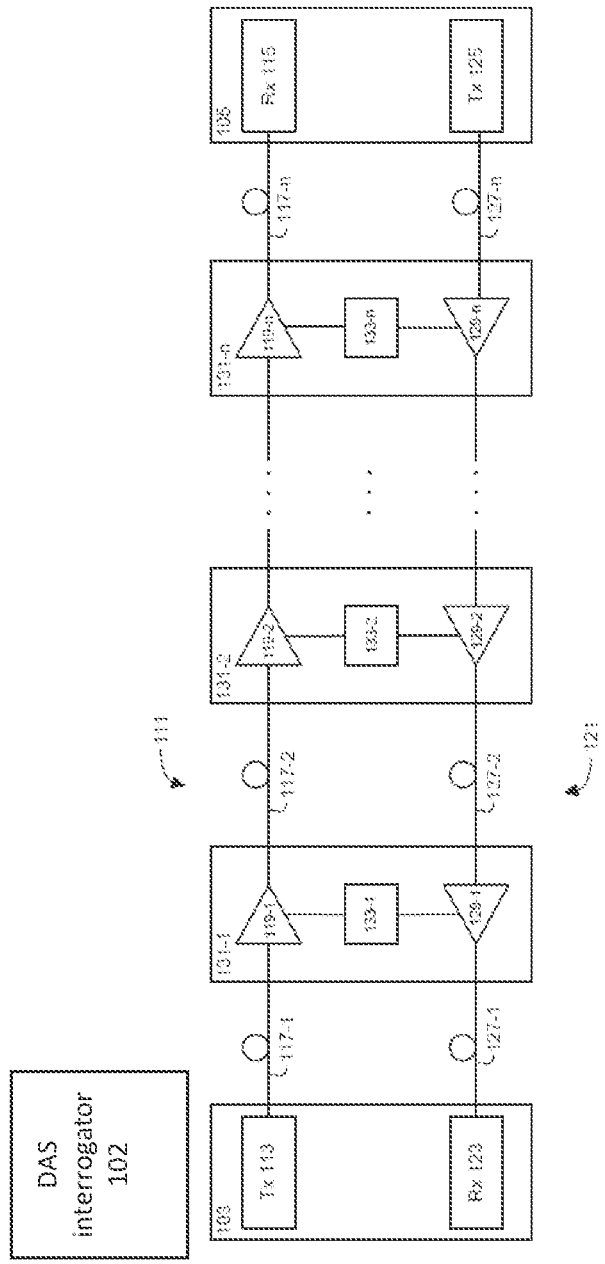
FIG. 1 illustrates an example optical communication system.

The present embodiments will now be described more fully hereinafter with reference to the accompanying drawings, in which exemplary embodiments are shown. The scope of the embodiments should not be construed as limited to the embodiments set forth herein. Rather, these embodiments are provided so that this disclosure will be thorough and complete, and will fully convey the scope of the embodiments to those skilled in the art. In the drawings, like numbers refer to like elements throughout.

Before detailing specific embodiments with respect to the figures, general features with respect to the embodiments will be reviewed. Novel DAS apparatus, systems, and architecture are provided to extend the range of DAS sensing capability, in particular across multiple spans of a subsea system including underground optical cables. According to various embodiment, the range of DAS sensing is extended, while the localization capability is improved or maintained by providing span-specific return signal detection components, as discussed below.

In some embodiments, techniques for extending distributed acoustic sensing (DAS) range in undersea optical cables are provided. For example, DAS range can be extended by transmitting and amplifying a DAS signal along multiple spans of a first optical fiber, routing or bypassing the DAS signal from the first optical fiber to a second optical fiber different from the first fiber via a high-loss loopback architecture, and returning and amplifying the DAS signal along the same multiple spans back to a DAS device. The DAS device may then receive and process the DAS signal to detect any changes in the DAS environment. The loopback configuration may be based on different types of loopback architecture.

According to some embodiments, a DAS signal (e.g., light signal) may be transmitted by a DAS device (e.g., DAS interrogator) from a first end of an optical cable. This DAS signal may be referred to as a transmit DAS signal. The transmit DAS signal may propagate along a first optical fiber of a dedicated fiber pair of the optical cable in a first direction and may be periodically amplified by one or more optical amplifiers spaced along the fiber. The optical amplifiers are provided to overcome loss budget limitations of DAS equipment and loopbacks with return fiber path are to deliver DAS interrogation signal back to the DAS receiver. At a predefined distance along the optical cable (e.g., after the "Nth" amplifier along the cable), the transmit DAS signal may be returned back to the DAS device by routing or bypassing the DAS signal to a second optical fiber of the dedicated fiber pair of the optical cable using high-loss loopback architecture. In this regard, loopbacks are needed to route reflected DAS signals from a given span back to the DAS receiver (DAS interrogator) through a return path, due to the fact that each optical amplifier has optical isolators allowing light propagation only in one direction.

The embodiments to follow are characterized by a DAS interrogator (DAS device) located at the end of an optical subsea cable that includes a multiplicity of spans. For example, a span may correspond to the distance between repeaters in a subsea communication system, where a given repeater includes at least one amplifier to amplify a DAS signal in at least one direction. In various embodiments, a DAS signal is transmitted outbound along the optical cable through a DAS dedicated fiber pair. The outbound DAS signal is periodically amplified by the inline amplifiers, where the DAS signal may also be reflected using a loopback architecture in every span by Raleigh backscattering Reflected (Raleigh backscattered). In this manner, according to some non-limiting embodiments, the reflected DAS signal from every span may be routed back through a loopback at every span, into a return fiber, also configured with inline amplifier(s).

By at least (i) transmitting and amplifying a DAS signal along multiple spans of a first optical fiber, (ii) routing or bypassing the DAS signal from the first optical fiber to a second optical fiber different from the first fiber via a high-loss loopback architecture, and (iii) returning and amplifying the DAS signal along the same multiple spans back to a DAS device, the DAS range can be extended in ways that are significantly advantageous and improved over prior solutions. In conventional solutions, the DAS range is typically limited to a single fiber span (e.g., the range cannot extend beyond the first amplifier), but the DAS range extension techniques described herein at least lengthen the DAS range past the single fiber span. Advantageously, the range extension length is flexible and variable, e.g., the DAS range extension length can be designed and adjusted according to various use cases. Moreover, at least the loopback architecture allows DAS systems with extended range to be used in undersea applications since just a single DAS device is required unlike conventional DAS systems that include numerous DAS devices.

As such, the present embodiments provide for high interrogation rate in a DAS system, independently of the distance from DAS equipment, thus allowing detection over a large range of frequencies. Note that in existing DAS schemes, an interrogation rate F is limited by distance L as $F=c/2nL$, where c is the speed of light and n refractive index. In the present embodiments of the disclosure, interrogation frequencies may be limited by the amplifier span length $L_a$ as $F=c/2nL_a$, but not by distance form interrogator L. Thus, the interrogation rate may be maintained at a value defined by the length of an amplifier span over an arbitrarily long optical cable with just one DAS interrogator at one end, merely by providing amplifiers at a fixed span interval defined by $L_a$.

As will be further described in detail below, according to various embodiments, a DAS system is provided based upon fiber pairs, where a DAS signal may be routed or bypassed from the first optical fiber to the second optical fiber of the bidirectional fiber pair based on different high-loss loopback architectures. In one example, the routing or bypass may be based on an output-to-output loopback architecture in which a first end of a loopback fiber is coupled to an output of an amplifier of the first optical fiber and a second opposed end of the loopback fiber is coupled to an output of an amplifier of the second optical fiber. In another example, the routing or bypass may be based on an output-to-input loopback architecture in which a first end of a loopback fiber is coupled to an output of an amplifier of the first optical fiber and a second opposed end of the loopback fiber is coupled to an input of an amplifier of the second optical fiber.

Accordingly, broader coverage provided by the extended DAS range allows a DAS system to better monitor subsea related activities. For example, the optical cables of the extended DAS system can be used to hear or monitor earthquakes, sea floor movement, ship signatures, passing of ships, dropping of anchors, dragging of fishing nets, etc. To at least that end, the optical cables effectively act as microphones to monitor potential issues or problems that may occur undersea, such as aggressions or potential aggressions to optical cables of an subsea optical communication system.

In various embodiments of the disclosure, components are provided in a DAS system to provide for span-specific detection of return signals to a DAS interrogator. As detailed below, in some embodiments, to provide span-specific detection, in addition to loopbacks between fiber pairs, a novel DAS system is provided with an array of optical filters that includes selective optical filters located at a plurality of spans of a subsea optical communications system. This configuration allows a DAS interrogator to receive a DAS signal at a specific wavelength that is characteristic of a specific filter located at a specific span. In different embodiments, the optical filters may be tunable or fixed.

As further detailed below, in different variants of a DAS system having an optical filter array, the DAS signal launched by a DAS interrogator may be sent on a single wavelength or sent along multiple wavelengths, where a given wavelength is specific to a given span of the subsea optical system. In particular embodiments, where a DAS system operates at a single wavelength, either the DAS frequency may be tuned to the frequency suitable for a specific span/optical filter, or alternatively, a plurality of tunable filters may be provided along the subsea cable, at different loopbacks, so that a given tunable filter at a given span, may be tuned in or tuned out as appropriate, in order to transmit of block a return signal to be received by the DAS interrogator.

In further embodiments, as detailed below, a DAS system is provided with a configuration where a plurality of loopbacks are arranged between fiber pairs, where optical switches are arranged within a loopback path, in order to receive a DAS signal from a specific span of a subsea optical system. In this manner, any span may be interrogated separately by switching on or off the different switches provided in the different loopbacks.

By way of reference, various configurations of a DAS system according to different embodiments of the disclosure are illustrated with respect to FIGS. 2-5 to follow. According to various embodiments of the disclosure, a DAS system may be integrated into a subsea optical communication system based upon optical cables where communications are transmitted over multiple channels. The DAS system may be integrated with an optical communication system that is provided with bidirectional communication capability, as detailed below with respect to FIG. 1. In addition, FIG. 6 depicts a general scenario for detecting and locating a disturbance using an extended-range DAS system, according to the present embodiments.

Referring to the drawings, FIG. 1 illustrates an exemplary bidirectional optical communication system 101 which system may use high-bandwidth fiber optics to transmit vast amounts of data over long distances. Thus, the bidirectional optical communication system 101 may be considered a long-haul optical communication system. Bidirectional data transmission may be implemented by constructing pairs of optical fibers within an optical cable and transmitting one or more channels, e.g., wavelength division multiplexed channels, per fiber pair.

As shown, the optical communication system 101 may include terminals 103 and 105 connected by two unidirectional optical paths 111, 121, which together form a bidirectional optical fiber pair. Optical path 111 may transmit signal(s), data, information, etc. in one direction (e.g., to the right) from a transmitter 113 at terminal 103 to a receiver 115 at terminal 105. Optical path 121 may transmit signal(s), data, information, etc. in the other direction (e.g., to the left) from a transmitter 125 at terminal 105 to a receiver 123 at terminal 103.

With respect to terminal 103, the optical path 111 is an outbound path and the optical path 121 is an inbound path. The optical path 111 may include optical fibers 117-1 to 117-n and optical amplifiers 119-1 to 119-n, and the optical path 121 may include optical fibers 127-1 to 127-n and optical amplifiers 129-1 to 129-n. The optical fibers 117-1 to 117-n and 127-1 to 127-2 may be individual segments of a single optical fiber 117 and a single optical fiber 127, respectively, where the segments are formed by way of the coupling of the amplifiers to the optical fibers 117 and 127, as shown.

In examples, the one or more of the optical amplifiers 119-1 to 119-n and 129-1 to 129-n may be Erbium-doped fiber amplifiers (EDFAs). It may be understood that, in some examples, transmitter 113 and receiver 123 may be housed together as a transponder or transceiver at terminal 103, and similarly, transmitter 115 and receiver 125 may also be housed together as a transponder or transceiver at terminal 105.

The optical path pair (e.g., optical paths 111, 121) may be configured as a set of amplifier pairs 119-1 to 119-n and 129-1 to 129-n within repeaters 131-1 to 131-n connected or coupled thereto by pairs of optical fibers 117 (e.g., via 117-1 to 117-n) and 127 (e.g., via 127-1 to 127-n), which may be included in an optical fiber cable together with other fibers or fiber pairs supporting additional path pairs. Each repeater 131 may include at least a pair of amplifiers 119, 129 for each path pair and may include additional amplifiers for additional path pairs.

The optical amplifiers 119, 129 may utilize EDFAs or other rare earth doped fiber amplifiers, e.g., Raman amplifiers, semiconductor optical amplifiers (SOAs). Coupling paths 133-1 to 133-n may be coupled between optical paths 111, 121, for example, in one or more of the repeaters 131-1 to 131-n. It may be understood that the term "couple" or "coupled," as used herein, broadly refers to any connection, connecting, coupling, link, or linking, either a direct or indirect or a wired or wireless connection and does not necessarily imply that the coupled components or elements are directly connected to each other.

In some embodiments, a DAS system may be integrated with the optical communications system 101 as represented by DAS interrogator 102.

Figure 2:
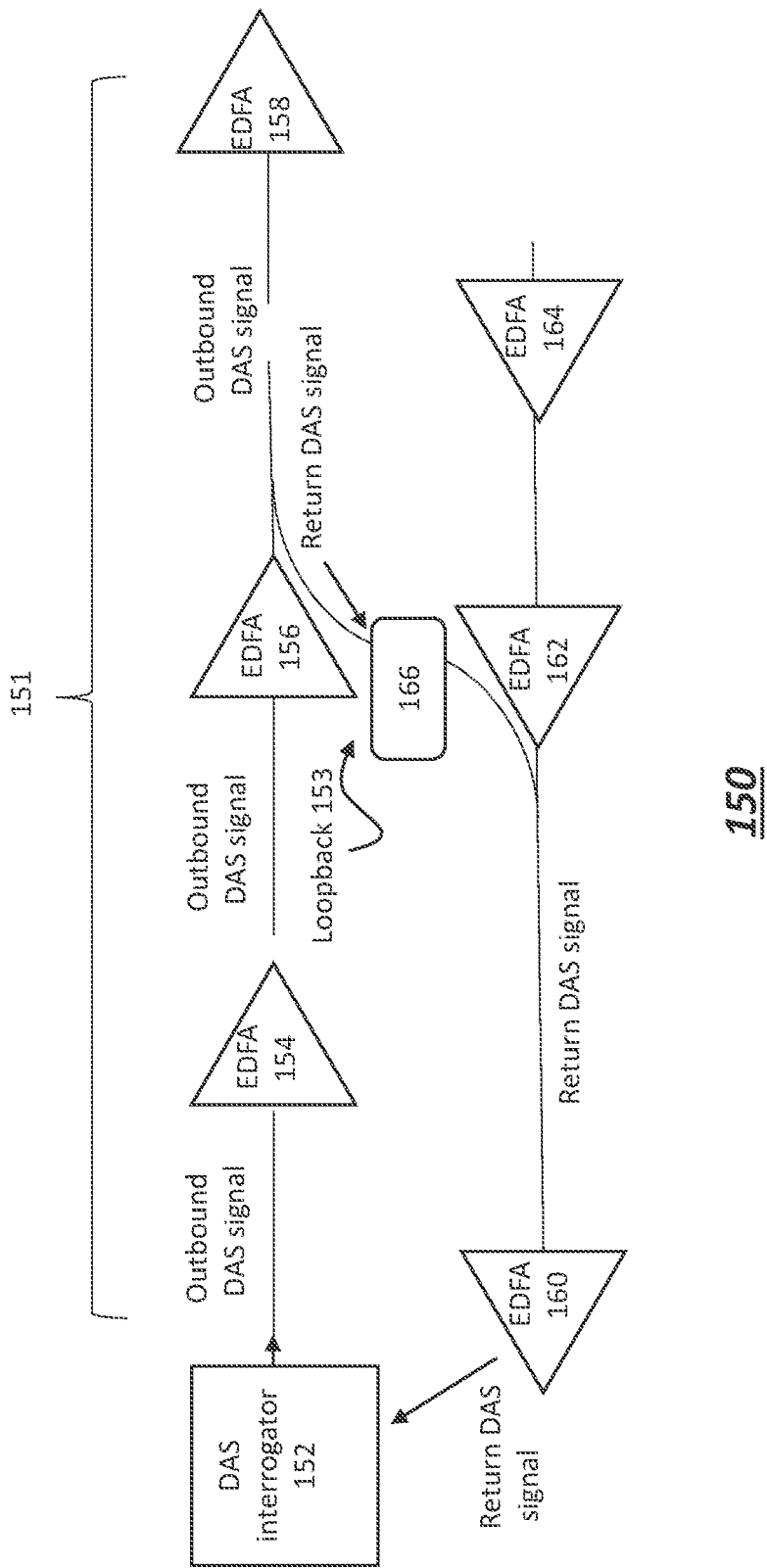
FIG. 2 illustrates the architecture of a first DAS system according to embodiments of the disclosure.

FIG. 2 illustrates the architecture of a first DAS system, shown as DAS system 150, according to embodiments of the disclosure. As shown, the DAS system 150 may include a DAS interrogator 152 that is coupled to a DAS transmission system 151, arranged in a high-loss loopback architecture, where just one loopback, a loopback 153, is depicted. The DAS interrogator 152 may include a laser source, not shown, to generate an outbound DAS signal that is transmitted along the DAS transmission system 151. In this figure, and other figures to follow, outbound DAS signals as well as return DAS signals, may be transmitted along optical fibers as generally described with respect to bidirectional communication system 101. Note that according to various embodiments, these optical fibers may be dedicated for DAS signal transmission and may be separate from communication payload fibers of an optical cable. However, according to some embodiments, the DAS transmission system 151 may be integrated, at least in part, with a bidirectional optical communication system, such as bidirectional communication system 101. For example, components of the DAS transmission system 151 may be collocated with components of a bidirectional communications system. As an example, optical fibers of the DAS transmission system 151 may be collocated in a common optical cable of a bidirectional communication system 101. In addition, other components of the DAS transmission system 151, such as EDFAs may or may not be collocated with components of a bidirectional transmission system, such as at repeaters of a bidirectional communication system 101.

The DAS interrogator 152 may be configured to transmit an outbound DAS signal, receive a return DAS signal, based upon the outbound DAS signal, and perform processing on the received return DAS signal to extract acoustic characteristics or signatures of the undersea environment based at least in the part on the processing. In at least that regard, the DAS interrogator 152 may include appropriate hardware components, such as memory, one or more processors, interfaces, etc. to generate, transmit, receive, and analyze the returned DAS signal. In this embodiment, and other embodiments to follow, the outbound DAS signal may be transmitted as a series of pulses, where the return DAS signal is also characterized as a series of pulses. The DAS interrogator 152 may be included and housed in a terminal, or alternatively, may be a standalone device.

The DAS interrogator 152 may be coupled to a first optical fiber, which fiber provides the transmit path for an outbound DAS signal. When the outbound DAS signal is transmitted by the DAS interrogator 152, the outbound DAS signal propagates along the transmit path (generally to the right in the figure) and is periodically amplified by EDFAs 154, 156, 158, as shown in FIG. 2. As further shown, a loopback fiber, indicated by loopback 153, may be provided. For example, a first end of the loopback fiber at loopback 153 may be coupled to a first optical fiber that transmits the outbound DAS signal, at a coupling point; and a second end of the loopback fiber at loopback 153 may be coupled to a second optical fiber that transmits a return DAS signal at a coupling point, where the second optical fiber (shown on the lower path of FIG. 2) provides the return path for the return DAS signal. In examples, the return loopback fiber is configured as and/or provides a high-loss loopback path. Thus, via the loopback fiber at loopback 153, the outbound DAS signal on the transmit path is routed or bypassed to the second optical fiber—the return path—such that the outbound DAS signal propagates along the return path as the return DAS signal, where the return DAS signal may also be amplified, such as by at least EDFA 160, and returned back to the DAS interrogator 152, as illustrated.

It may be understood that the first and second optical fibers providing the transmit and return paths, respectively, may be included in or form a bidirectional optical fiber pair. In different embodiments, this fiber pair may be a standalone DAS-dedicated fiber pair, or alternatively, may be a payload carrying fiber pair, in which case the DAS signal may have a wavelength outside the payload channel wavelengths so that the DAS signal does not interfere with the payload signals. It may further be understood that every "Nth" opposing set of amplifiers (e.g., the Nth amplifier coupled to the first optical fiber and the Nth amplifier coupled to the second optical fiber) may be paired and housed in a same repeater (e.g., similar to the repeaters illustrated in FIG. 1).

Note that the EDFA 162, and EDFA 164, shown on the return path in FIG. 2, may be configured to amplify additional return DAS signals, derived from the outbound DAS signal, and routed through additional loopbacks of the optical transmission system 151 (not shown).

Note that in the arrangement of FIG. 2, as with conventional subsea optical transmission systems, the length of a span between repeaters, as represented by the distance between EDFAs, for example, may be on the order of 50 km to 100 km. Accordingly, the DAS system 150, by providing the arrangement of multiple EDFAs, may provide extended range DAS detection of disturbances, using just the DAS interrogator 152, where DAS detection is extended beyond the length of a single span, such as an extended range of multiple spans of an optical communications system.

To further highlight this advantage afforded by the present embodiments, FIG. 6 illustrates an arrangement 500 for extended DAS range that is provided according to the present embodiments. In the example of FIG. 6, the optical transmission system 101 is depicted as a series of repeaters 506, 508, 510, 512, 514, and 516, where these repeaters may include conventional equipment to transmit subsea optical communications, in a bidirectional manner. Additionally, the aforementioned components of a DAS system, such as DAS system 150, may be integrated into the arrangement 500, where, in some embodiments, the components of the DAS system 150, may be collocated with components of an optical transmission system 101.

By doing so, an outbound DAS signal may be transmitted from a DAS interrogator 152 (located at the coast), which signal propagates along a first optical fiber and periodically amplified by the EDFAs of DAS transmission system 151 (see FIG. 2), which EDFAs may be located in repeaters 506, 508, and 510, and is routed or bypassed to a second optical fiber via a loopback fiber (not shown in FIG. 6) located in one or more of the repeaters, so that the outbound DAS signal can be amplified in the opposite direction and returned back to the DAS interrogator 152. Accordingly, the configuration of a loopback fiber at the location associated with the repeater 510 allows for an extended DAS range up to approximately that repeater 510; the configuration of a loopback fiber at the location associated with the repeater 512 allows for an extended DAS range up to approximately that repeater 512; the configuration of a loopback fiber at the location associated with the repeater 514 allows for an extended DAS range up to approximately that repeater 514; the configuration of the loopback fiber at the location associated with a repeater 516 allows for an extended DAS range up to approximately that repeater 516, and so forth.

In some examples, the DAS transmission system 151 may be coextensive with the bidirectional optical communication system 101. Thus, the bidirectional optical communication system 101 may be a transoceanic system that spans 6000 km and includes 80 repeaters, for example. Likewise, the DAS transmission system 151 may span the same 80 repeaters, thus allowing activities occurring anywhere along the subsea optical cable of the bidirectional optical communication system 101 to be monitored by the DAS interrogator 152. If, for instance, a ship 520 conducts fishing activities far out in the ocean, such as between repeaters 514 and 516, those activities can be effectively monitored and analyzed by way of at least the further extended DAS range, as shown. Thus, ship 520 (e.g., ship acoustic signature), the activities (e.g., dragging of anchor, dragging of fishing net), and potential aggressions the ship may cause on the optical cable of the optical communication system 101 can be monitored by way of at least the extended DAS range, which monitoring is advantageous over the conventional limited DAS range, discussed previously.

Returning to FIG. 2, as shown, a loopback component 166 is provided at the loopback 153, where the loopback component 166 may regulate transmission of the return DAS signal at the loopback 153. As detailed below, examples of a loopback component 166 for regulating the transmission of the return DAS signal include an optical filter or optical switch. However, other components for regulating the return DAS signal are possible. As detailed with respect to the figures to follow, a loopback component such as loopback component 166, may modify the return DAS signal(s) (including block the return DAS signal) that is directed over a loopback to the DAS interrogator, in a manner that provides loopback-specific, or span-specific information regarding the return DAS signal, and thus facilitating better identification and localization of a perturbance near the DAS transmission system 151.

Figure 3:
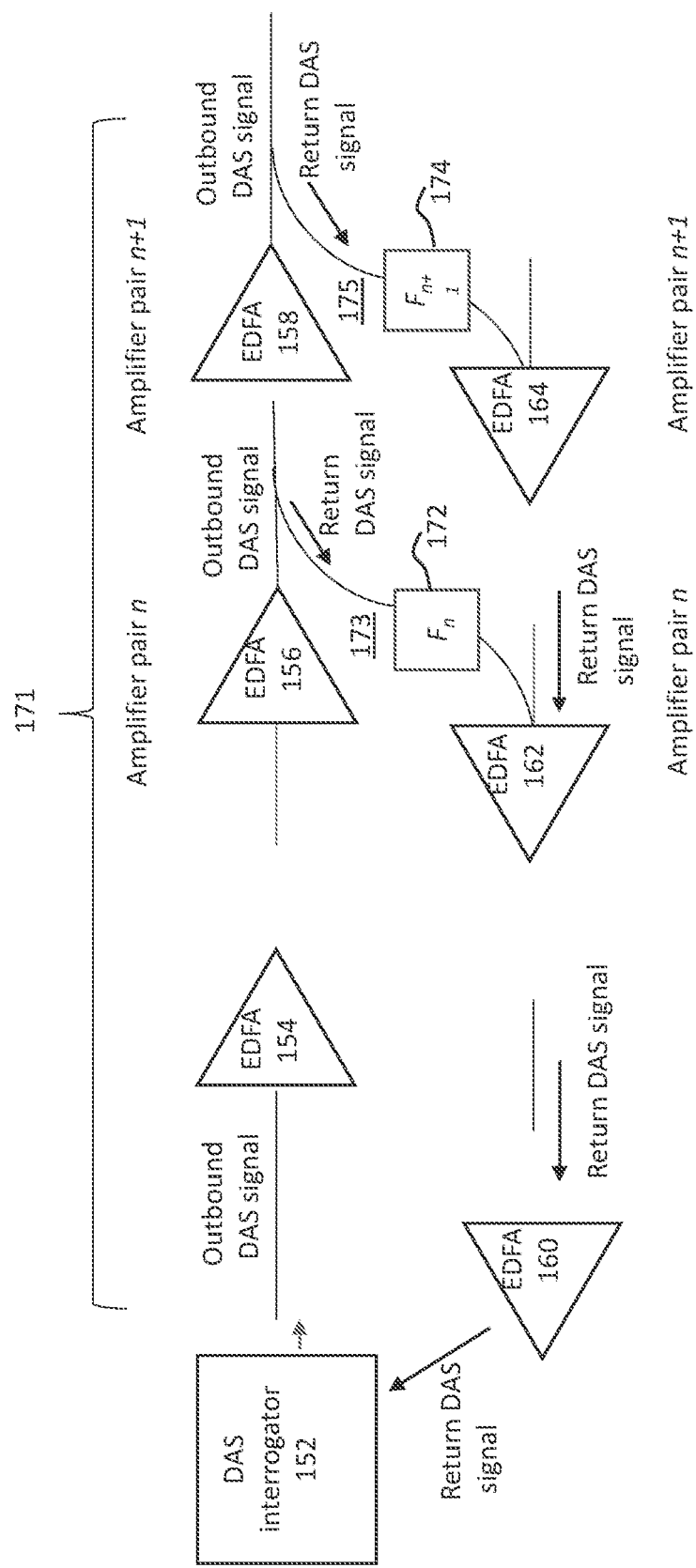
FIG. 3 illustrates the architecture of a second DAS system according to embodiments of the disclosure.

Turning now to FIG. 3, the architecture is shown for a second DAS system, shown as DAS system 170, according to embodiments of the disclosure. The DAS system 170 may share common components with the DAS system 150, described previously, where the function of these components may similar to the previously described function. The DAS system 170 includes the DAS interrogator 152, and a DAS transmission system 171, including a plurality of EDFAs, as shown, both along an outbound direction (top) and a return direction (bottom). In this illustration, multiple loopbacks are depicted, including loopback 173 and loopback 175. In some configurations, an outbound EDFA and a return EDFA may be associated in an amplifier pair, as illustrated by amplifier pair n (EDFA 156 and EDFA 162) and amplifier pair n+1 (EDFA 158 and EDFA 164).

In operation after amplifier pair n the outbound DAS signal may be returned back to the DAS interrogator 152 by routing the outbound DAS signal from a first optical fiber to a second optical fiber of a bidirectional fiber pair using high-loss loopback architecture, shown as loopback 173. The return DAS signal is then routed through EDFA 162 and EDFA 160 before being received back at DAS interrogator 152.

In addition, after amplifier pair n+1 a portion of the outbound DAS signal may be returned back to the DAS interrogator 152 by routing the outbound DAS signal through loopback 175, in a manner similar to the routing through loopback 173. The return DAS signal is then routed through EDFA 164, EDFA 162 and EDFA 160 before being received back at DAS interrogator 152. Note that the DAS transmission system 171 may include further amplifier pairs, where the amplifier pairs may be spaced out according to the spans of a bidirectional optical communications system, discussed above. Thus, in some examples, the amplifier pairs may be spaced out from one another by a distance of 50 km, 70 km, 90 km, or similar value. In some examples, the amplifier pairs of the DAS transmission system may be collocated with repeaters of a bidirectional optical communications system. Thus, in a transoceanic cable, the DAS transmission system 171 may include up to dozens of amplifier pairs and associated loopbacks.

The DAS transmission system 171 further includes an array of optical filters, where the array of optical filters includes a given optical filter, associated with a given loopback. In some embodiments, an optical filter may be provided with each loopback of the DAS transmission system 171. FIG. 3 depicts two of these optical filters, shown as optical filter 172 (also indicated by $F_n$), disposed along the path of a first DAS return signal, associated with amplifier pair n and loopback 173, and optical filter 174 (also indicated by $F_{n+1}$), disposed along the path of a second DAS return signal, associated with amplifier pair n+1 and loopback 175. In various embodiments, each optical filter of the array of optical filters is provided with a component to filter and transmit a return DAS signal with a span (loopback)-specific central frequency. In this manner, each loopback of the DAS transmission system 171 will direct a return DAS signal to the DAS interrogator 152 at a specific frequency associated with that loopback. Moreover, since the given loopback is associated with a given span along the DAS transmission system 171, the DAS interrogator 151 may perform span-specific DAS sensing by interrogating a given DAS return signal at a frequency for the loopback filter associated with the span of interest. In other words, not only can the DAS transmission system 171 be employed to interrogate DAS information at distances as far as the number of amplifier pairs provided, but the return DAS signals may be interrogated to provide DAS information that is localized to a given span or loopback.

As noted above, according to various embodiments, the DAS interrogator 152 may operate at a single wavelength or optical frequency. In operation of the DAS system 170 according to one variant, the DAS frequency may be tuned to the frequency suitable for a specific span/optical filter of the DAS transmission system 171, in order to transmit of block a return DAS signal to be received by the DAS interrogator 152.

In operation according to another variant, the aforementioned optical filters (172, 174, etc.) may be provided as a plurality of tunable filters, so that a given tunable filter at a given span, may be tuned in or tuned out as appropriate, in order to transmit or block a return DAS signal to be received by the DAS interrogator 152.

Figure 3A:
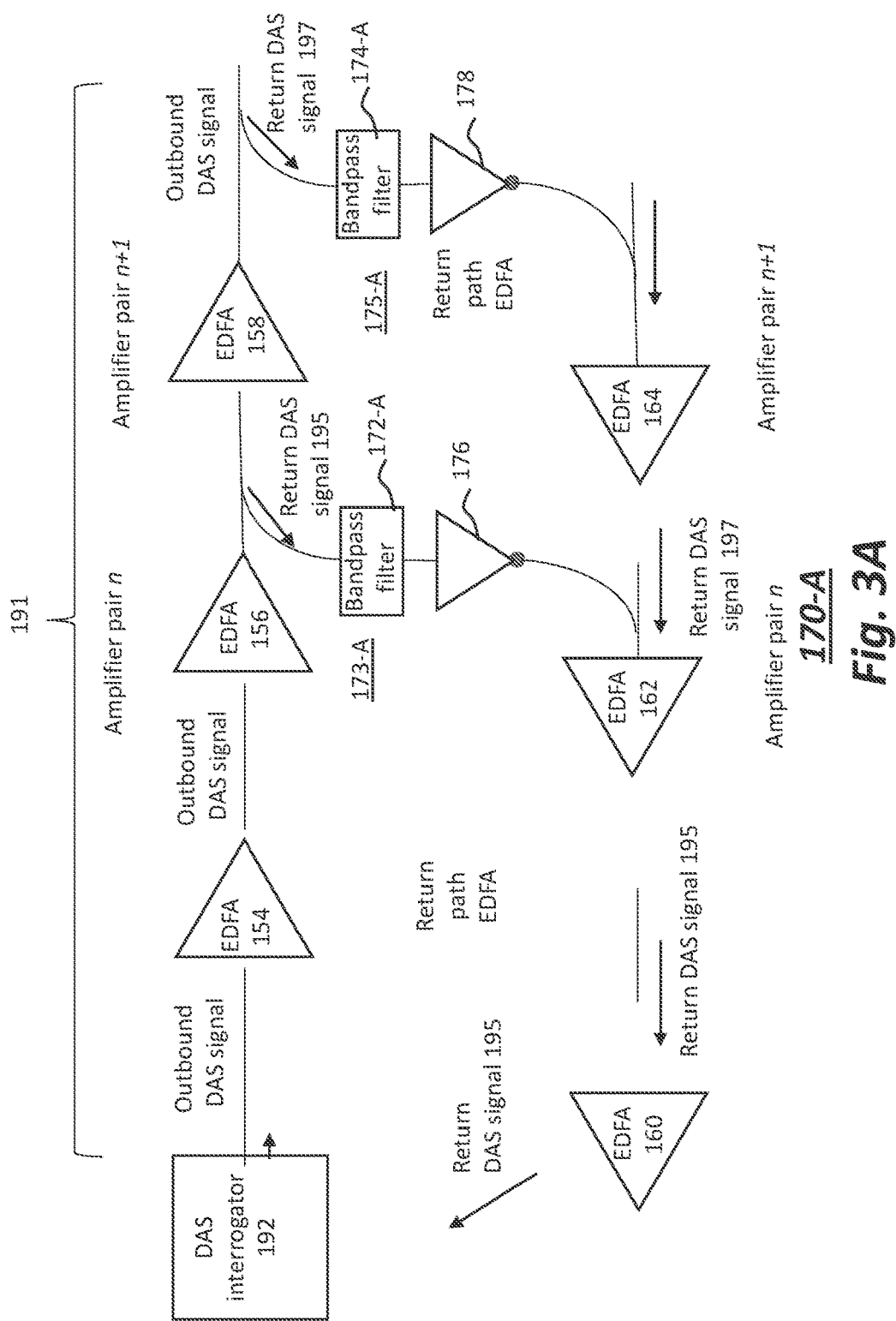
FIG. 3A illustrates the architecture of a third DAS system according to embodiments of the disclosure.

FIG. 3A illustrates the architecture of a third DAS system according to embodiments of the disclosure. The DAS system 170-A may share most of the same components as DAS system 170, where the DAS system 170-A may be considered a variant of the DAS system 170. A main difference between the two DAS systems is that in the DAS system, the loopback 173-A includes an EDFA 176, and the loopback 175-A includes an EDFA 178. Note that other loopbacks of the DAS system (not shown) may similarly be equipped with a respective bandpass filter and EDFA. Note that the two optical bandpass filters shown in loopback 173-A and loopback 175-A, shown as bandpass filter 172-A, and bandpass filter 174-A, may be similar to or the same as optical filter 172, and optical filter 174. In this embodiment, by virtue of the provision of bandpass filters and EDFAs in the respective loopbacks of the DAS system 190-A, the noise performance and interrogation distance may be improved. In the example of FIG. 3A, bandpass filters 172-A and 174-A are placed before the EDFA 176 and EDFA 178. In other embodiments, these filters may be placed after corresponding EDFAs when the return path signal would otherwise be too low for acceptable processing at the DAS interrogator. In other words, this alternative placement of filters may be done to improve the noise performance of the return path EDFA 176 and EDFA 178.

Figure 4:
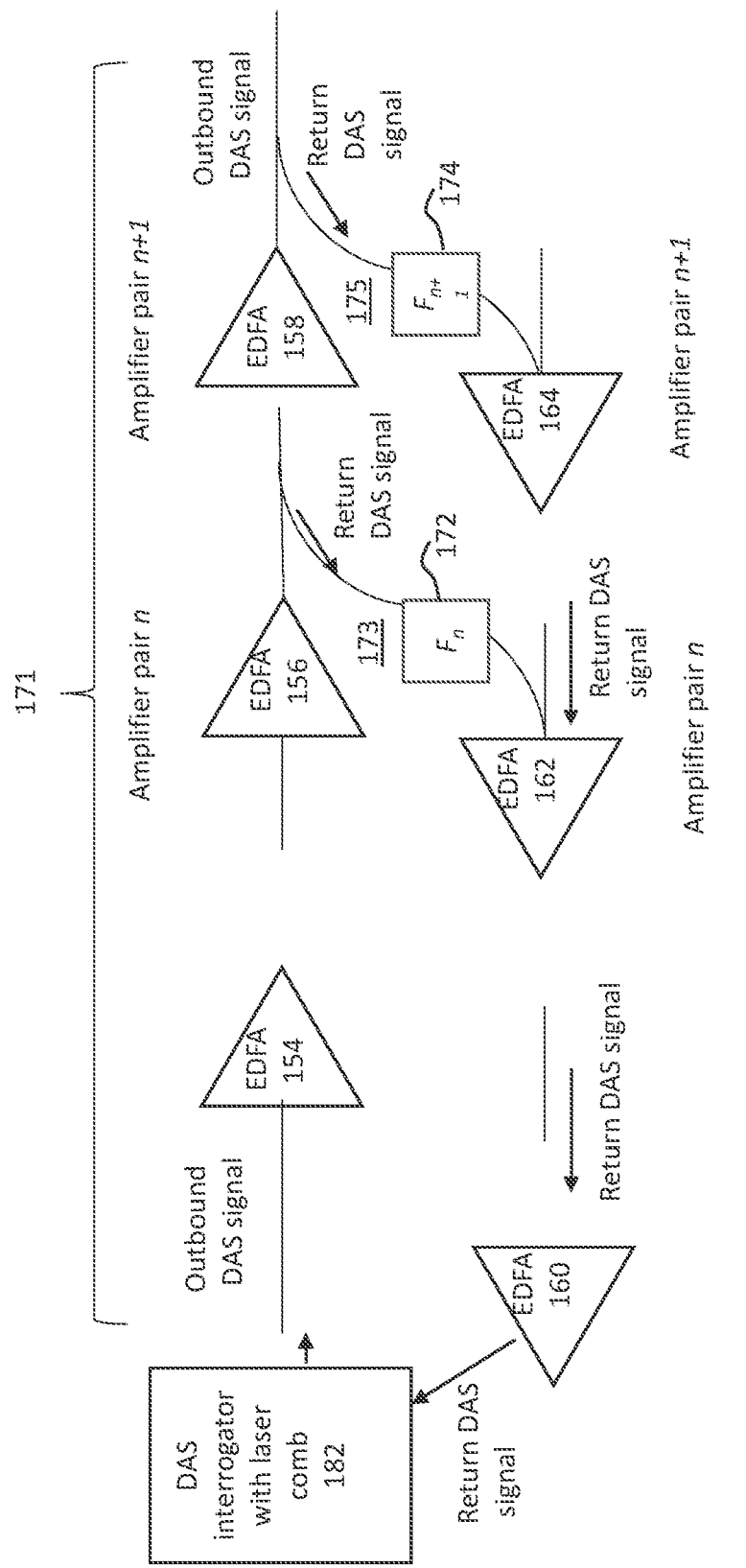
FIG. 4 illustrates the architecture of a fourth DAS system according to embodiments of the disclosure.

Turning now to FIG. 4, the architecture is shown for a fourth DAS system, shown as DAS system 180, according to embodiments of the disclosure. The DAS system 180 may share common components with the DAS system 150, and DAS system 170, described previously, where the function of these components may similar to the previously described function. The DAS system 180 differs from the DAS system 170 in that a DAS interrogator 182 is provided, which interrogator includes a laser comb or similar structure.

In operation, the DAS interrogator 182 may generate an outbound DAS signal that is modulated by the laser comb so that the outbound DAS signal is transmitted over a plurality of optical frequencies, that correspond to a respective plurality of filter frequencies that are associated with the respective optical filters of the different loopbacks of DAS transmission system 171. In this manner, when the outbound DAS signal is routed through a given loopback of the DAS transmission system 171, the given portion of the outbound DAS signal that corresponds to the transmit frequency of the optical filter of that loopback will be returned to the DAS interrogator 182. Accordingly, multiple DAS return signals, each signal being associated with a different loopback, may be simultaneously received and interrogated by the DAS interrogator 182. Moreover, the DAS interrogator may advantageously associate each of the multiple simultaneously received return DAS signals with a specific span or loopback location of the DAS transmission system 171, according to the frequency of the given DAS return signal.

Figure 5:
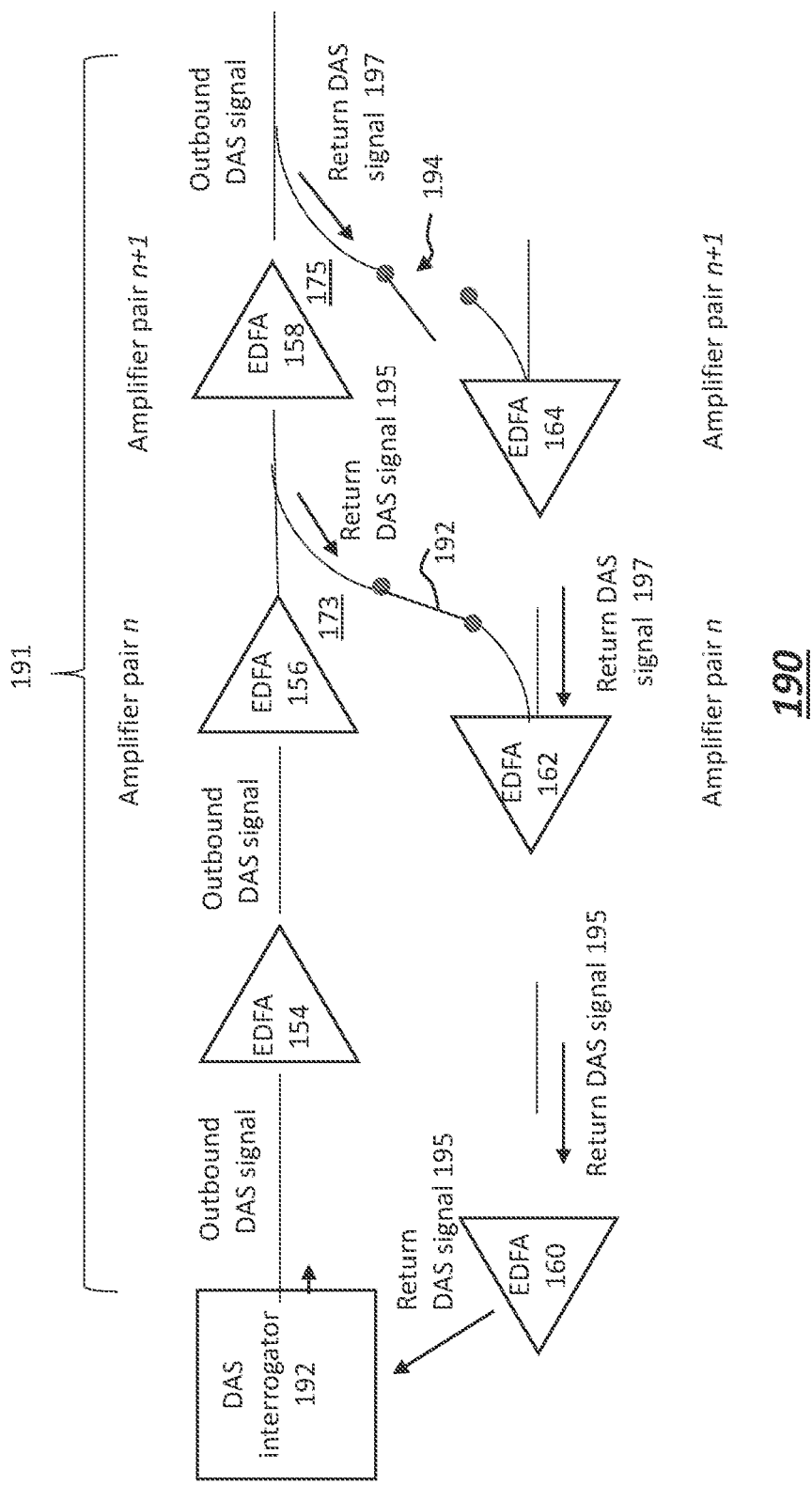
FIG. 5 illustrates the architecture of a fifth DAS system according to embodiments of the disclosure.

FIG. 5 illustrates the architecture of a fifth DAS system, shown as DAS system 190, according to embodiments of the disclosure. The DAS system 190 may share common components with the DAS system 150, DAS system 170, and DAS system 180, described previously, where the function of these components may similar to the previously described function. The DAS system 180 includes the DAS interrogator 152, and a DAS transmission system 191, including a plurality of EDFAs, as shown, both along an outbound direction (top) and a return direction (bottom). In this illustration, multiple loopbacks are depicted, including loopback 173 and loopback 175. In some configurations, an outbound EDFA and a return EDFA may be associated in an amplifier pair, as illustrated by amplifier pair n (EDFA 156 and EDFA 162) and amplifier pair n+1 (EDFA 158 and EDFA 164).

In the DAS transmission system 191 is equipped with an array of optical switches, where the array of optical switches includes a given optical switch, associated with a given loopback. In some embodiments, an optical switch may be provided with each loopback of the DAS transmission system 191. According to various embodiments, an optical switch may be switchable by mechanical means, electrical means, electromechanical means, electrooptical means, or otherwise.

FIG. 5 depicts two of these optical switches, shown as optical switch 192, disposed along the path of a first DAS return signal, associated with amplifier pair n and loopback 173, and optical switch 194, disposed along the path of a second DAS return signal, associated with amplifier pair n+1 and loopback 175. In various embodiments, each optical switch of the array of optical switches is operable to open or close according to control signals that may be supplied by the DAS interrogator 192. In this manner, DAS return signals that are routed through each loopback of the DAS transmission system 191 may be transmitted to the DAS interrogator 192 or blocked from transmission to the DAS interrogator 192, as desired.

In operation, according to some embodiments, the DAS interrogator 192 may transmit an outbound DAS signal to the DAS transmission system 191, so that a plurality of DAS return signals are rerouted through a respective plurality of loopbacks. In order to interrogate a DAS return signal specific to a given span or loopback of the DAS transmission system 191, the DAS interrogator may send a set of switch control signals, to set the state of each optical switch of the loopbacks. For example, the set of switch control signals may include a single switch close signal sent to a targeted optical switch at a targeted loopback, and may include multiple switch open signals that are sent to all other optical switches at all other loopbacks of the DAS transmission system 191. In this manner, at the time of sending of the outbound DAS signal, just one optical switch at a targeted loopback may be placed in a close state in order to transmit a return DAS signal to the DAS interrogator 192 from the targeted loopback, while no return DAS signals are received from other loopbacks of the DAS transmission system. This circumstance then facilitates individual DAS interrogation of each particular span of the DAS transmission system 191. Of course in some scenarios, all the optical switches may be set a default open position so that the DAS interrogator 192 may send a single switch close signal to a chosen optical switch, in order to individually interrogate a targeted loopback associated with the chosen optical switch.

In the scenario of FIG. 5, the optical switch 192 is closed, while the optical switch 194 is open. It may be assumed that other optical switches (not shown) of the DAS transmission system 191 are also open. Thus all return DAS signals (see, e.g., return DAS signal 197) are blocked at open optical switches of the respective loopbacks, except for the return DAS signal 195, routed through loopback 173.

Figure 5A:
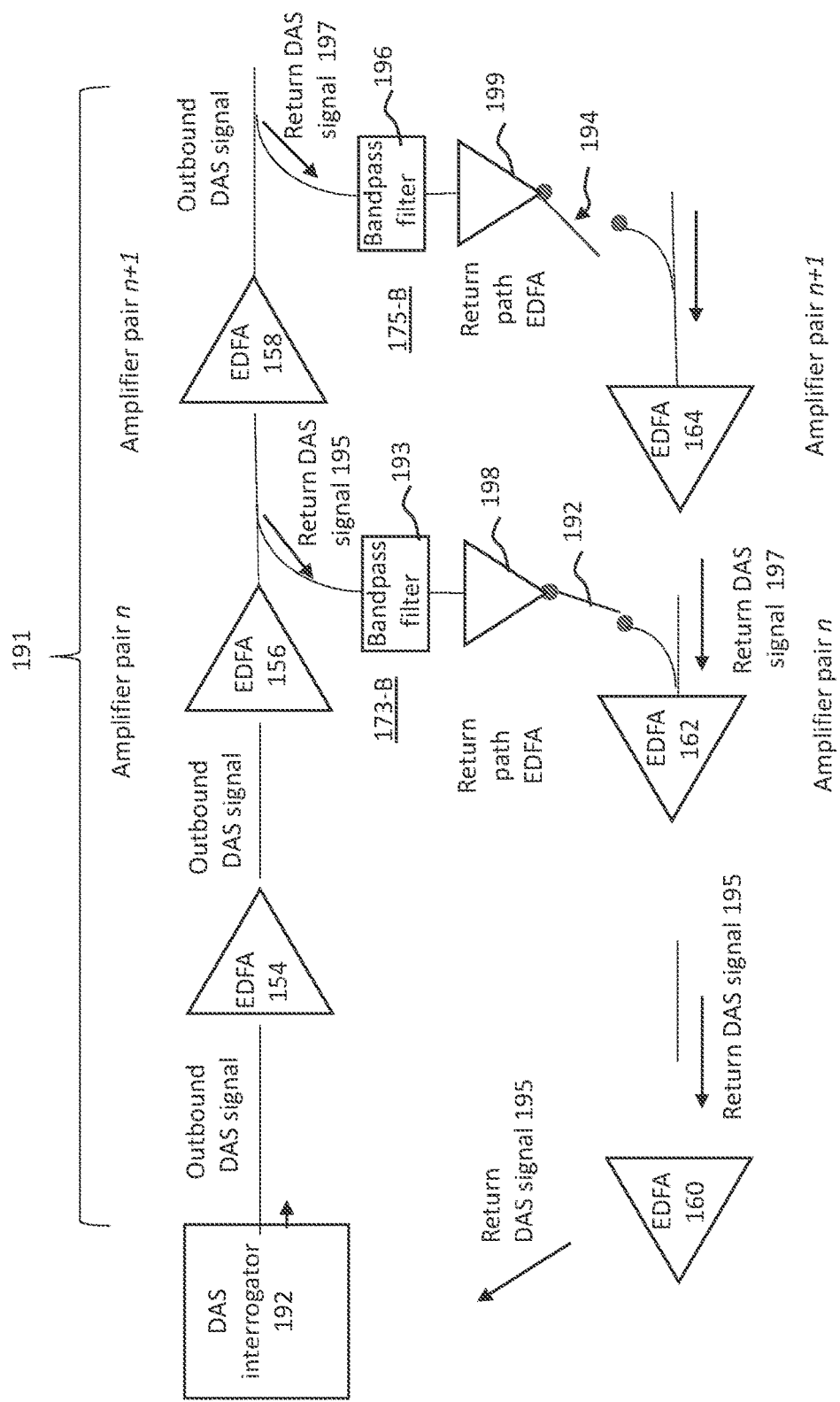
FIG. 5A illustrates the architecture of a sixth DAS system according to embodiments of the disclosure.

FIG. 5A illustrates the architecture of a sixth DAS system according to embodiments of the disclosure. The DAS system 190-A may share most of the same components as DAS system 190, where the DAS system 190-A may be considered a variant of the DAS system 190. A main difference between the two DAS systems is that the DAS system 190-A includes in-line bandpass filters in the respective loopbacks of the DAS system 190-A. In the example of FIG. 5A, two bandpass filters are shown, filter 193, in loopback 173-B, and filter 196, in loopback 175-B. These bandpass filters are arranged inline with the respective optical switches, discussed previously, with respect to FIG. 5. Note that the two optical bandpass filters shown in loopback 173-B and loopback 175-B, shown as bandpass filter 193, and bandpass filter 176, may be similar to or the same as optical filter 172, and optical filter 174. In addition, the loopback 173-B includes an EDFA 198, and the loopback 175-B includes an EDFA 199. Note that other loopbacks of the DAS system (not shown) may similarly be equipped with a respective bandpass filter and EDFA. In this embodiment, by virtue of the provision of bandpass filters and EDFAs in the respective loopbacks of the DAS system 190-A, the noise performance and interrogation distance may be improved. In the example of FIG. 5A, two bandpass filters are placed before the EDFA 198 and EDFA 199. In other embodiments, these filters may be placed after corresponding EDFAs when the return path signal would otherwise be too low for acceptable processing at the DAS interrogator. In other words, this alternative placement of filters may be done to improve the noise performance of the return path EDFA 198 and EDFA 199.

FIG. 7 illustrates an example flow diagram 700 according to embodiments of the disclosure. For example, the distributed acoustic sensing illustrated in flow diagram 700 may be performed by a DAS interrogator, which may be coupled to a bidirectional optical fiber pair (e.g., dedicated DAS fiber pair, already existing optical system payload carrying fiber pair). At block 702, a first outbound DAS signal is directed along a DAS transmission system over a first fiber of a fiber pair. According to some embodiments, the fiber pair may be included in a DAS transmission system that is arranged at least partially within a bidirectional optical communication system.

At block 704, a first return DAS signal based upon the first outbound DAS signal is directed or routed over a second fiber of the fiber pair, through a given loopback of the DAS transmission system.

At block 706, the first return DAS signal is filtered through a first optical filter associated with the given loopback, wherein the filtered first return DAS signal is transmitted at a targeted optical frequency.

At block 708, a DAS interrogator is set to receive the filtered first return DAS signal at the targeted optical frequency, in order to process and analyze the first return DAS signal appropriately. In some examples, additional return DAS signals, derived from the first outbound signal, may be routed back to the DAS interrogator through other loopbacks, through additional optical filters that transmit at optical frequencies other than the targeted optical frequency. In this manner, such additional DAS return signals may not interfere with the processing of the first filtered return DAS signal being analyzed by the DAS interrogator.

FIG. 8 illustrates an example flow diagram 800 according to further embodiments of the disclosure. At block 802, an outbound DAS signal is directed along a DAS transmission system over multiple optical fibers of an optical cable. In some examples, the DAS transmission system includes a plurality of amplifier pairs that may be distributed over the DAS transmission system at intervals on the order of 50 km to 100 km. In some examples, the amplifier pairs may be collocated at repeaters of a bidirectional optical communications system that may employ communication channels over the same optical cable of the DAS transmission system.

At block 804, a first return DAS signal based upon the outbound DAS signal is directed or routed through a chosen loopback associated with a chosen span of the DAS transmission system.

At block 806, a second return DAS signal based upon the outbound DAS signal is directed or routed through an additional loopback associated with an additional span of the DAS transmission system.

At block 808, the first return DAS signal is interrogated at a DAS interrogator by setting the first optical switch to a closed position at the chosen loopback and setting a second optical switch at the additional loopback to an open position. In some examples, the first return DAS signal may be individually interrogated by setting all optical switches of the DAS transmission system at all loopbacks other than the chosen loopback to an open position, thus blocking all return DAS signals except the first return DAS signal from propagating to a return fiber of the DAS transmission system that conducts DAS signals to the DAS interrogator.

FIG. 9 illustrates an example flow diagram 800 according to other embodiments of the disclosure. At block 902, an outbound DAS signal is directed at multiple select optical frequencies along an optical cable of a DAS transmission system. At block 904, a first return DAS signal based upon the outbound DAS signal is directed or routed through a given loopback of the DAS transmission system, at a first frequency of a set of select optical frequencies.

At block 906, a second return DAS signal based upon the outbound DAS signal is directed or routed through an additional loopback of the DAS transmission system, at a second frequency of the set of select optical frequencies.

At block 908, a DAS interrogator is set to simultaneously receive and process the first return DAS signal at the first frequency and the second return DAS signal at the second frequency.

In some examples, the operations of blocks 902 through 908 may be accomplished by generating the an outbound DAS signal from a laser comb structure so the DAS signal is transmitted over a plurality of optical frequencies, that correspond to a respective plurality of filter frequencies that are associated with respective optical filters located at the given loopback and the additional loopback. In this manner, when the outbound DAS signal is routed through the given loopback and the additional loopback, the portions of the outbound DAS signal that correspond to the transmit frequencies of the given loopback optical filter and the additional loopback optical filter will be returned to the DAS interrogator for simultaneous reception and/or processing.

Herein, novel and inventive apparatus, system and techniques for extending DAS range over multiple spans in optical cables using loopback technology are disclosed, including providing span-specific DAS information. The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings.

Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

What is claimed is:

1. A system comprising:
a DAS interrogator to launch an outbound DAS signal;
an outbound signal path for transmitting the outbound DAS signal over at least one outbound optical fiber;
a plurality of outbound amplifiers, coupled along the outbound signal path, and separated from one another by a distance defining a span;
a return signal path for conducting a plurality of return DAS signals based upon the outbound DAS signal, over a return optical fiber;
a plurality of return amplifiers, coupled along the return signal path, and separated from one another by a distance defining a span;
a plurality of loopbacks, to reroute the outbound DAS signal between the outbound signal path and the return signal path, to form the plurality of return DAS signals; and
a loopback component, arranged in at least one loopback of the plurality of loopbacks, to regulate transmission of a return DAS signal from the loopback to the DAS interrogator.

2. The system of claim 1, the loopback component comprising an optical filter.

3. The system of claim 2, further comprising a loopback amplifier, disposed in the loopback.

4. The system of claim 1, the loopback component comprising an optical switch.

5. The system of claim 4, wherein the optical switch is switchable by mechanical means, electrical means, electromechanical means, or electrooptical means.

6. The system of claim 5, further comprising a loopback amplifier, and a bandpass filter, disposed in the loopback.

7. The system of claim 6, wherein the bandpass filter is placed between the loopback amplifier and the return signal path.

8. The system of claim 1, wherein at least some amplifiers of the outbound amplifiers, return amplifiers, or a combination thereof are erbium doped fiber amplifiers, other rare earth doped fiber amplifiers, Raman amplifiers, semiconductor optical amplifiers, or combination thereof.

9. A method, comprising:
   launching a DAS signal from a DAS interrogator over an outbound DAS signal path, comprising at least one optical fiber;
   amplifying the outbound DAS signal at a plurality of amplifiers along the outbound DAS signal path, the plurality of amplifiers being distributed over a plurality of spans;
   routing the outbound DAS signal into a plurality of loopbacks arranged between the outbound DAS signal path and a return DAS signal path;
   transmitting, along the return signal path, at least one return DAS signal from at least one loopback of the plurality of loopbacks to the DAS interrogator; and
   amplifying the at least one return DAS signal,
   wherein the at least one return DAS signal is processed by a component located at the at least one loopback to provide span-specific DAS information to the DAS interrogator.

10. The method of claim 9, wherein an optical filter is disposed in at least one loopback of the plurality of loopbacks.

11. The method of claim 10, wherein a loopback amplifier, disposed in the at least one loopback.

12. The method of claim 9, wherein an optical switch is disposed in at least one loopback of the plurality of loopbacks.

13. The method of claim 12, wherein the optical switch is switchable by mechanical means, electrical means, electromechanical means, or electrooptical means.

14. The method of claim 13, further comprising a loopback amplifier, and a bandpass filter, disposed in the at least one loopback.

15. The method of claim 14, wherein the bandpass filter is placed between the loopback amplifier and the return signal path.

16. The method of claim 9, wherein at least some amplifiers of the outbound amplifiers, return amplifiers, or a combination thereof are erbium doped fiber amplifiers, other rare earth doped fiber amplifiers, Raman amplifiers, semiconductor optical amplifiers, or combination thereof.

17. A system comprising:
   a DAS interrogator to launch an outbound DAS signal;
   an outbound signal path for transmitting the outbound DAS signal over at least one outbound optical fiber;
   a plurality of outbound amplifiers, coupled along the outbound signal path, and separated from one another by a distance defining a span;
   a return signal path for conducting a plurality of return DAS signals based upon the outbound DAS signal, over a return optical fiber;
   a plurality of return amplifiers, coupled along the return signal path, and separated from one another by a distance defining a span;
   a plurality of loopbacks, to reroute the outbound DAS signal between the outbound signal path and the return signal path, to form the plurality of return DAS signals;
   a loopback component, arranged in at least one loopback of the plurality of loopbacks, to regulate transmission of a return DAS signal from the loopback to the DAS interrogator; and
   an optical amplifier, disposed in the at least one loopback.

18. The system of claim 17, the loopback component comprising an optical filter.

19. The system of claim 17, the loopback component comprising an optical switch.

20. The system of claim 19, wherein the optical switch is switchable by mechanical means, electrical means, electromechanical means, or electrooptical means.

* * * * *